March 13, 1962 E. J. PETHERICK 3,025,509

DIGITAL ENCODERS

Filed Nov. 14, 1956 4 Sheets-Sheet 1

Inventor
EDWARD JOHN PETHERICK
By
Stevens, Davis, Miller & Mosher
Attorneys

March 13, 1962 E. J. PETHERICK 3,025,509

DIGITAL ENCODERS

Filed Nov. 14, 1956 4 Sheets-Sheet 2

Inventor
EDWARD JOHN PETHERICK
By
Stevens, Davis, Miller & Mosher
Attorneys

March 13, 1962

E. J. PETHERICK 3,025,509

DIGITAL ENCODERS

Filed Nov. 14, 1956

4 Sheets-Sheet 3

Inventor
EDWARD JOHN PETHERICK
By
Stevens, Davis, Miller & Mosher
Attorneys

March 13, 1962 E. J. PETHERICK 3,025,509

DIGITAL ENCODERS

Filed Nov. 14, 1956 4 Sheets-Sheet 4

Inventor
EDWARD JOHN PETHERICK
By
Stevens, Davis, Miller & Mosher
Attorneys

United States Patent Office 3,025,509

Patented Mar. 13, 1962

3,025,509

DIGITAL ENCODERS

Edward John Petherick, Rowledge, near Farnham, England, assignor to National Research Development Corporation, London, England, a British company Filed Nov. 14, 1956, Ser. No. 622,180
Claims priority, application Great Britain Nov. 18, 1955
20 Claims. (Cl. 340—347)

Figure 1:
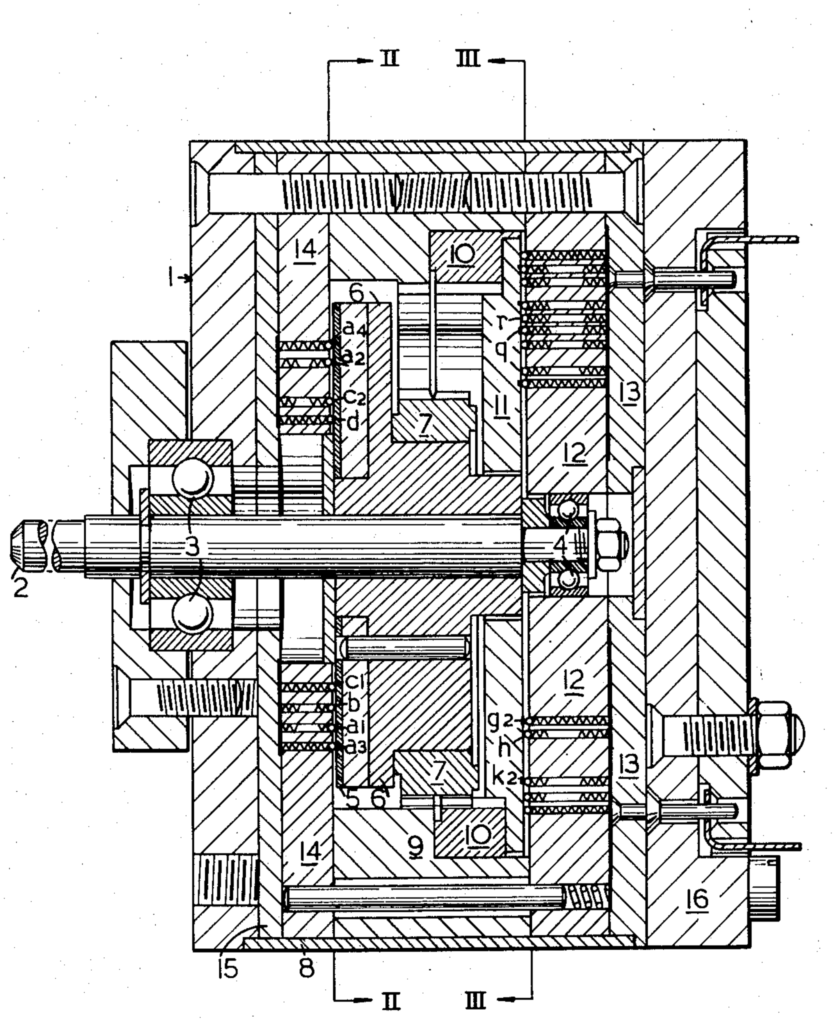

The present invention relates to digital encoders of the type which represent the position of a body relative of a datum position by means of electrical signals in accordance with a predetermined code.

When it is desired to represent digitally the position of a body relative to a datum position, it is often convenient to derive the higher order digits representing the position of the body (that is to say, the so-called coarse representation of the position of the body) from a coarse commutator which is rotated relative to some other datum position as the body moves. Thus, for example, the body may include a fine encoder (from which a representation of the lower order digits representing the position of the body is derived) which drives the coarse commutator through a rack-and-pinion drive. Alternatively, the body may be a shaft which drives a fine commutator (which forms part of the fine encoder) directly and may drive a coarse commutator through a gear, the two commutators, together with means for reading them, providing a digital representation of the rotational position of the shaft over a number of complete revolutions of the shaft.

However, when gears are used between the coarse commutator and the fine encoder, backlash may occur between the gear wheels. This backlash may result in an incorrect reading of the coarse commutator.

It is an object of the present invention to provide a digital encoder having a coarse commutator driven by means of a gear from a fine encoder and in which the effects of backlash in the gear driving the coarse commutator may be greatly reduced.

According to the present invention, an electrical digital encoder includes a fine encoder for defining digitally the position of an object relative to a datum position, a coarse encoder including a coarse commutator and brushes bearing thereon and movable relative thereto, gear means for driving the coarse encoder from the fine encoder, on the coarse commutator a plurality of tracks each marked with conductive regions and non-conductive regions in accordance with a predetermined code, means for feeding inputs to conductive regions of the coarse commutator and means for coding the said inputs in accordance with outputs from the fine encoder, the arrangement of the brushes and the conductive regions and the coding of the inputs to conductive regions being such that the outputs from the brushes provide a coarse representation of the position of the object relative to the datum position.

According to a feature of the present invention, there is provided an electrical digital encoder including a fine commutator, a coarse commutator, gear means for driving the coarse commutator from the fine commutator, on the coarse commutator a plurality of tracks each marked with conductive regions and non-conductive regions in accordance with a predetermined code, means for feeding inputs to conductive regions of the coarse commutator, means for coding the said inputs in accordance with the position of the fine commutator relative to a datum position and means for taking outputs from the coarse commutator, the arrangement and mode of energisation of the conductive regions being such that the said outputs provide a coarse representation of the position of the fine commutator relative to the datum position.

According to a further feature of the present invention, there is provided an electrical digital encoder including a shaft, a coarse commutator having a plurality of tracks thereon each marked with a succession of conductive regions and non-conductive regions in accordance with a predetermined code, gear means connecting the shaft to the coarse commutator and arranged to rotate the coarse commutator at a speed different from the speed of rotation of the shaft, means for feeding inputs to conductive regions of the coarse commutator, these inputs being coded according to the angular position of the shaft, and means for taking outputs from the tracks of the coarse commutator, the arrangement and mode of energisation of the conductive regions being such that the said outputs provide a coarse representation of the rotational position of the shaft.

According to a still further feature of the present invention, the coarse commutator comprises a disc on one face of which the annular tracks are marked in the form of conductive regions interspaced with non-conductive regions. The conductive regions may take the form of lands of, say, copper, and the non-conductive regions may take the form of some non-conductive plastic material. The coded inputs to conductive regions on the coarse commutator may be derived from outputs of a fine commutator through brushes bearing on coded feed tracks on the coarse commutator, provision being made for electrical connections between conductive regions on the coded feed tracks and conductive regions on other tracks of the coarse commutator.

Figure 2:
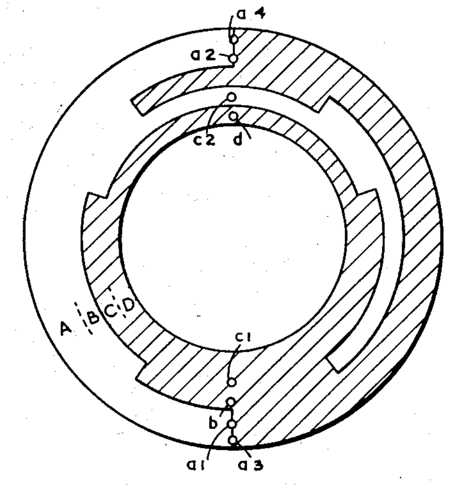
Figure 3:
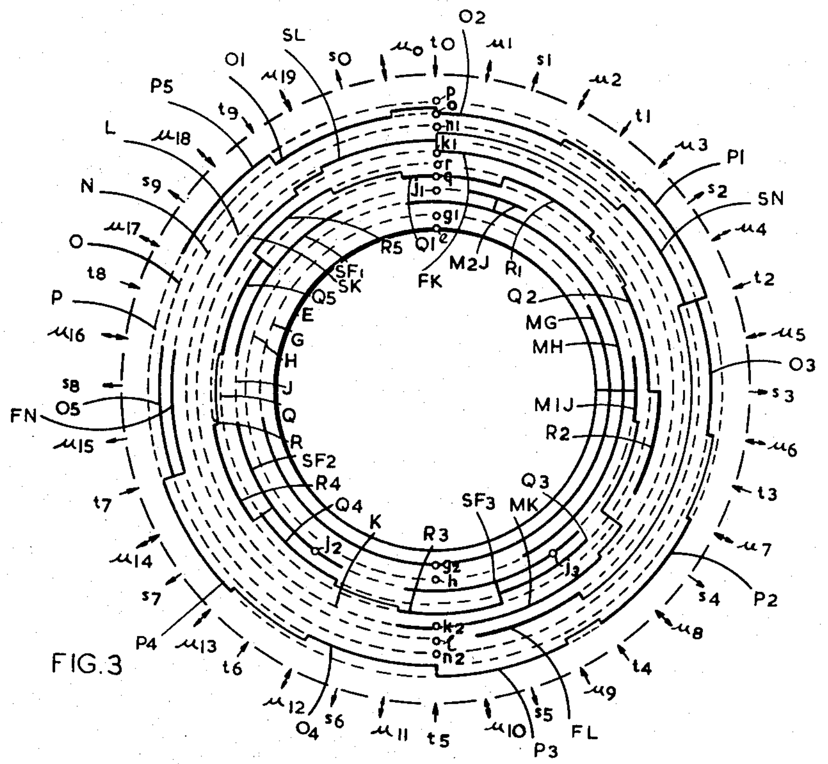
Figure 4:
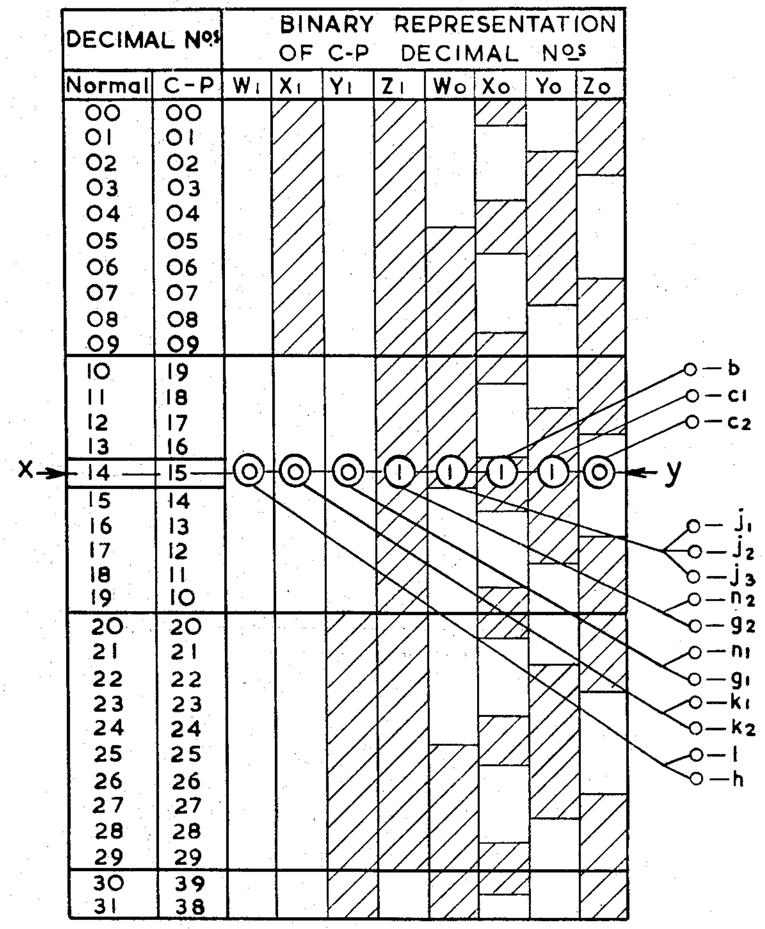
Figure 5:
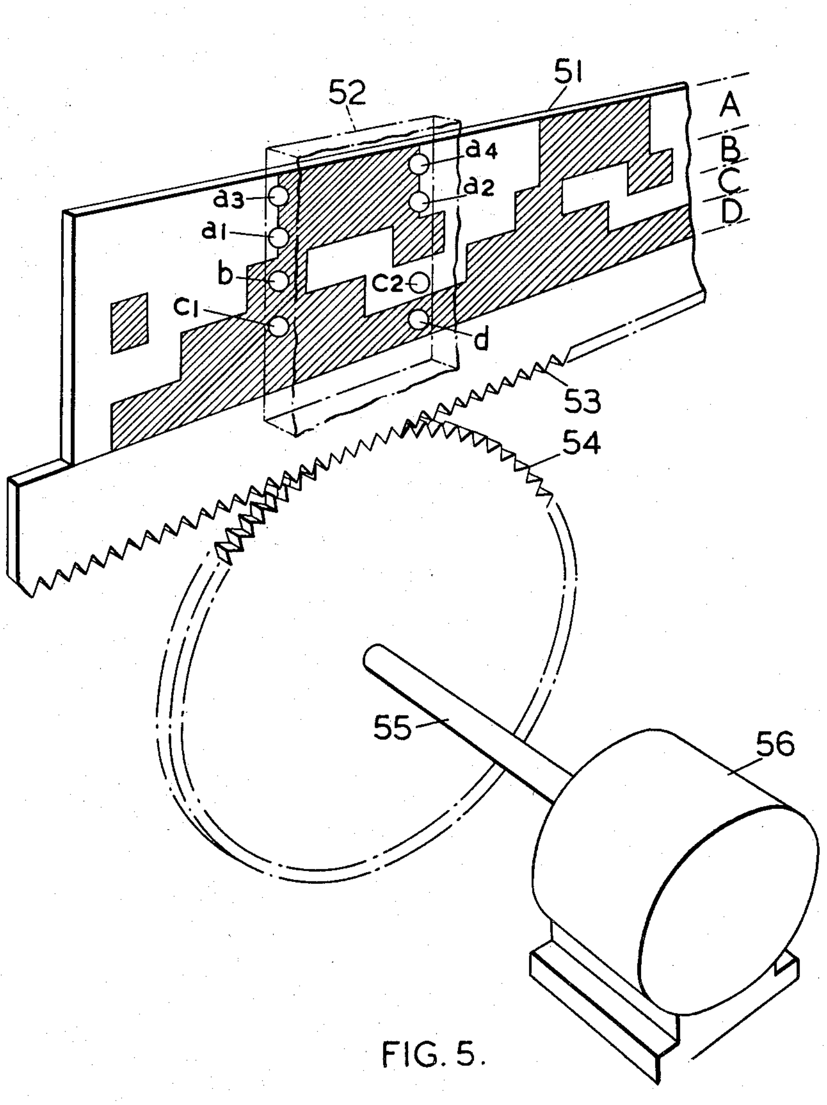

In order that the invention may be more clearly understood, embodiments thereof will now be described, by way of example, with reference to the accompyanying drawings, in which:

FIGURE 1 is a sectional view of a digital encoder,

FIGURE 2 is an elevation view of a fine commutator, which forms part of digital encoder, corresponding to a view taken from the line II in FIGURE 1, FIGURE 3 is an elevation view of a coarse commutator, which forms part of digital encoder, corresponding to a view taken from the line III in FIGURE 1, FIGURE 4 shows diagrammatically the digital representation of the rotational position of the shaft of an encoder, for three and one fifth revolutions of the shaft, and FIGURE 5 is a diagrammatic perspective view of an alternative embodiment of the invention.

FIGURE 1 shows a digital encoder comprising a main body member 1 which supports a shaft 2 in bearings 3 and 4. The shaft 2 carries a fine commutator 5 upon a supporting disc 6. Brushes, in the form of balls $a_1$, $a_2$, $a_3$, $a_4$, $c_1$, $c_2$, and $d$ bear on the surface of the commutator 5. Outputs are taken from these balls through the helical springs which hold them in position set in an insulating member 14, to printed circuit connectors on the face of the disc 15. The shaft 2 also carries a gear wheel 7, which is loose on an eccentric which is itself rigidly attached to the shaft. The teeth of the gear wheel 7 engage with a gear wheel 9 which has one hundred teeth and is fixed to the main body member 1. Another gear wheel 10 is freely mounted for rotation within the gear 9. The gear wheel 10 has ninety teeth which also engage with the gear wheel 7. Therefore, for every ten complete rotations of the shaft 2 the gear wheel 10 will rotate completely only once. Preferably, the gear wheel 7 is provided with two sets of teeth, one set to engage with the gear wheel 9 and the other set to engage with the gear wheel 10. However, it may be possible, in some circumstances, to arrange one set of teeth on the gear wheel 7 so as to engage satisfactorily with both of the gear wheels 9 and 10. The outer sleeve 8 plays a part in connecting the gear 9 to the end cheek 16.

The gear wheel 10 carries a coarse commutator 11 so that this commutator rotates with the gear wheel 10.

Brushes, in the form of balls, bear on the coarse commutator 11. In the FIGURE 1 three brushes $q$, $r$ and $g_2$ are shown. It is to be understood that there are provided other balls similarly arranged to bear on the coarse commutator. Outputs are taken from these balls through the helical springs which hold them in position set in an insulating member 12, to printed circuit connectors on the face of the disc 13. The commutators 5 and 11 will be described hereinafter in greater detail with reference to FIGURES 2 and 3 respectively.

The commutators 5 and 11 are coded in accordance with a cyclic permuting binary-decimal code of a type described in copending patent application Serial No. 478,031, filed December 28, 1954, now U.S. Pat. No. 2,975,409. In this code, the cyclic permuting decimal digits representing a normal decimal number are obtained by substituting for a digit in the normal decimal number, the complement on nine of the digit whenever the immediately preceding digit of greater significance in the normal decimal number is odd. Thus the normal decimal numbers 0 to 21 would be represented in the cyclic permuting decimal code as 00, 01, 02, 03, 04, 05, 06, 07, 08, 09, 19, 18, 17, 16, 15, 14, 13, 12, 11, 10, 20 and 21 respectively. Such a code is called a reflecting decimal code. In the cyclic permuting binary-decimal code, each digit of a cyclic permuting decimal code is represented in a cyclic permuting manner by four binary digits. Three of the four binary digits (referred to hereinafter as the X, Y and Z binary digits) define by means of five different combinations, five pairs of decimal digits, each pair consisting of a digit less than five and that digit's complement on nine. The fourth binary digit (hereinafter referred to as the W binary digit) defines which digit of any pair of decimal digits is the cyclic permuting decimal digit represented by the binary code. That is to say, the W binary digit indicates whether the cyclic permuting decimal digit represented by the four-digit binary code is greater than four or less than five. One particular binary code is used on the commutators shown in the drawings. This code may be shown to be basically the same as other possible four-digit binary codes having the same properties. The code is set forth in the following table.

| Cyclic Permuting Decimal Digit Represented | Binary Code | | | |
|---|---|---|---|---|
| | W | X | Y | Z |
| 0 | 0 | 1 | 0 | 1 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 1 | 1 | 1 | 0 |
| 6 | 1 | 0 | 1 | 0 |
| 7 | 1 | 0 | 1 | 1 |
| 8 | 1 | 0 | 0 | 1 |
| 9 | 1 | 1 | 0 | 1 |

Binary digits which occur in different separate positions in a code, like the W, X, Y and Z binary digits, will be referred to in the appended claims as code elements.

The embodiment illustrated in FIGURES 1 to 4 is designed to indicate the rotational position of the shaft 2, in the cyclic permuting binary-decimal code hereinbefore described, in tenths of a revolution for a maximum of ten revolutions. For this purpose, the fine commutator 5 and the coarse commutator 11 are each divided notionally into ten equal sectoral divisions. Thus, each division subtends an angle of thirty-six degrees at the centre of the commutator. The fine commutator is employed partially to define the least significant digit of the cyclic permuting decimal code (corresponding to the least significant digit of the corresponding normal decimal number) representing the number of tenths of a revolution the shaft has rotated. However, because the fine commutator 11 has only ten divisions, it is not possible to represent all four binary digits on this commutator, but only the X, Y and Z binary digits, referred to subsequently as the digits $X_0$, $Y_0$ and $Z_0$. If the fourth binary digit, W, were represented on the fine commutator 5, the reading from the commutator would return to 0101 (i.e. zero) every turn of the shaft, and the output from the coarse and the fine commutators would not be cyclic permuting.

The binary digit W of the binary representation of the least significant digit in the cyclic permuting decimal code, is subsequently referred to as the digit $W_0$. This digit $W_0$ is represented on the coarse commutator, together with the digits W, X, Y and Z in the binary representation of the next significant digit in the cyclic permuting decimal code; these digits are referred to subsequently as the digits $W_1$, $X_1$, $Y_1$, and $Z_1$. It should be noted that if the fine commutator were to be marked so that each division represented, say, one-twentieth of a revolution, the necessity of removing the $W_0$ digit from the fine commutator would not be present.

FIGURE 2 shows the fine commutator which comprises a copper disc having four annular tracks A, B, C and D on which bear brushes in the form of balls (shown superimposed on the view of the commutator) $a_1$, $a_2$, $a_3$, $a_4$; $b$; $c_1$, $c_2$; and $d$ respectively. The annular tracks A, B, C and D are formed by deep etching the copper disc to form non-conductive regions in the form of depressions and conductive regions in the form of lands. The depressions are filled flush with a suitably hard non-conductive resin. The lands are shown cross-hatched in the drawing; although the centre portion of the commutator is not shown cross-hatched for the sake of clarity. Track D is a continuous land which is used in conjunction with the ball-bearing $d$ to impart a voltage to the commutator disc. Balls $a_1$, $a_2$, $a_3$, $a_4$, $b$, $c_1$ and $c_2$ pick off this voltage when they contact lands on their respective tracks. Each land, and hence a voltage output from a ball, represents a binary digit 1.

The ten sectoral divisions of the fine commutator are coded in this manner, by means of the tracks B and C, with the digits $X_0$, $Y_0$ and $Z_0$. The digit $X_0$ is represented on the track B, the output corresponding to this digit being obtained from the ball $b$. By the use of two balls $c_1$ and $c_2$, outputs are obtained from the track C which correspond to the digits $Y_0$ and $Z_0$ respectively.

All the balls $a_1$, $a_2$, $a_3$, $a_4$, $b$, $c_1$ and $c_2$ are stationary, so that as the commutator rotates the outputs will vary according to the coding of the various tracks. In the position shown the balls $b$, $c_1$ and $c_2$ yield potential outputs representing the binary digits 1, 1 and 0 respectively. This indicates that the least significant digit of the cyclic permuting decimal code is a 4 or a 5, depending upon the output from the coarse commutator corresponding to the $W_0$ digit. For any position of the fine commutator the outputs from $b$, $c_1$ and $c_2$ represent the digits $X_0$, $Y_0$ and $Z_0$ respectively, in the binary representation ($W_0$, $X_0$, $Y_0$, $Z_0$) of the least significant digit in the cyclic permuting decimal code.

The track A is sufficiently wide to accommodate four balls $a_1$, $a_2$, $a_3$, $a_4$, placed in pairs as shown in FIGURE 2.

The outputs from the balls $a_1$ and $a_2$ (if they are placed accurately) are always different, each taking the values 0 and 1 once during each complete revolution of the commutator shaft. If the fine commutator is rotating in an anti-clockwise sense as viewed in FIGURE 2, the outputs from balls $a_1$ and $a_2$ change from 1 to 0 and 0 to 1, respectively, as the commutator passes through the position shown. The outputs from the balls $a_3$ and $a_4$ are identical with those from $a_1$ and $a_2$, respectively.

The coarse commutator is shown in FIGURE 3. It comprises a disc with copper lands set in insulating material. One method of construction of such a commutator is by etching a copper foil adjacent to a layer of thermoplastic material and then hot-pressing the copper lands to lie flush with the surface of the plastic. The fine commutator can also be made by the same technique. The lands are indicated by thick lines and they represent binary digits 1 when energised with a voltage.

This coarse commutator is notionally divided into ten equal sectoral divisions, the boundaries of which are indicated by the positions of the outwardly-directed arrows $s_0, s_1, \ldots s_9$. These divisions are subdivided once, the sub-divisions are equal and are indicated by the positions of the inwardly-directed arrows $t_0, t_1, \ldots t_9$. The totality of divisions $s_0, s_1, \ldots s_9; t_0, t_1, \ldots t_9$, is further subdivided once. These sub-divisions are equal and are indicated by the positions of the double arrows $u_0, u_1, \ldots u_{19}$.

There are eleven annular tracks E, G, H, J, K, L, N, O, P, Q and R on the coarse commutator, on which bear balls $e$; $g_1$, $g_2$; $h$; $j_1$, $j_2$, $j_3$; $k_1$, $k_2$; $l$; $n_1$, $n_2$; $o$; $p$; $q$; and $r$, respectively. The six tracks G, H, J, K, L and N on the coarse commutator are provided with conductive regions in the form of lands MG; MH; $M_1J$, $M_2J$, $SF_1$, $SF_2$, $SF_3$; SK, FK, MK; SL, FL; SN and FN, respectively. The ball $e$ is used to feed a voltage to the land which occupies the entire circumference of the track E. This land is electrically connected to the lands MG, MH, $M_1J$, $M_2J$ and MK.

The tracks O and P contain lands $O_1, O_2, \ldots O_5$, and $P_1, P_2, \ldots P_5$, respectively, which are connected together electrically and connected also to all the lands SK, FK, SL, FL, SN and FN. The tracks Q and R contain lands $Q_1, Q_2, \ldots Q_5$, and $R_1, R_2, \ldots R_5$, respectively, which are connected together electrically and connected also to the three lands $SF_1$, $SF_2$ and $SF_3$.

Hereinafter the lands MG, MH, $M_1J$, $M_2J$ and MK are called "main" lands, the lands $SF_1$, $SF_2$ and $SF_3$ are called "starter-finisher" lands, the lands SK, SL and SN are called "starter" lands, and the lands FK, FL and FN are called "finisher" lands. The reason for this terminology will become clear when the various functions of the lands are described.

The balls $o$ and $q$ associated with the coarse commutator are connected electrically to the balls $a_4$, and $a_2$ respectively, associated with the fine commutator: the balls $p$ and $r$ are similarly connected to the balls $a_1$ and $a_3$.

On the track J of the coarse commutator the set of lands $SF_1$, $SF_2$, $SF_3$, $M_1J$ and $M_2J$ represent the digit $W_0$, the output corresponding to this digit being obtained from the three balls $J_1$, $J_2$ and $J_3$ which are connected together electrically. To avoid repetition the output from these three balls will be referred to as the J-output.

In the following description it will be convenient to refer to the radial lines, corresponding to sectoral subdivisions of the coarse commutator, as the lines $s_0$, $u_0$, $t_0$, $u_1, \ldots$ et cetera. When any particular track on the coarse commutator is described, the word "division" will be used to signify a length of the track equal to one-fortieth of the circumference of that track, that is, the length of arc of the track subtending an angle of $\pi/20$ radians, or nine degrees, at the centre of the coarse commutator.

The centres of the main lands $M_1J$ and $M_2J$ are on the lines $s_3$ and $s_1$ respectively, and each land is two divisions in length. The centres of the starter-finisher lands $SF_1$, $SF_2$ and $SF_3$ are on the lines $s_9$, $s_7$ and $s_5$ respectively. Each of these lands is six divisions in length.

For convenience, the balls indicated as bearing on the tracks of the commutators shown in FIGURES 2 and 3, may be considered to rotate in a clockwise sense relative to the commutators. After one-half of a revolution of the shaft bearing the fine commutator, the positions of the balls relative to the fine and coarse commutators are as shown in FIGURES 2 and 3 respectively. In FIGURE 2 the binary digits $X_0$, and $Y_0$ and $Z_0$ are 1, 1 and 0 respectively, representing the pair of decimal digits 4/5. At that point it is necessary for the $W_0$ digit to change from 0 to 1. Thereafter it will be necessary for the $W_0$ digit to change after each complete revolution of the fine commutator. Hence the J-output must consist of five 0 digits and five 1 digits in the sequence 1010101010, for ten complete revolutions of the shaft.

The lands of the Q and R tracks are all three divisions in length. The lands $Q_1$, $Q_2$, $Q_3$, $Q_4$, $Q_5$, begin at the lines $u_0$, $u_4$, $u_8$, $u_{12}$, $u_{16}$, respectively, and end at the lines $s_1$, $s_3$, $s_5$, $s_7$, $s_9$, respectively. The lands $R_1$, $R_2$, $R_3$, $R_4$, $R_5$, begin at the lines $s_1$, $s_3$, $s_5$, $s_7$, $s_9$, respectively, and end at the lines $u_3$, $u_7$, $u_{11}$, $u_{15}$, $u_{19}$, respectively.

It will now be described how the arrangement of lands on the J-track together with the lands $Q_1, \ldots Q_5$; $R_1, \ldots R_5$, which lead voltage from the balls $q$ and $r$ to the starter-finisher lands at appropriate times, produce a suitable J-output for the representation of the $W_0$ digit.

It is to be remembered that the lands $M_1J$ and $M_2J$ are energised continuously with a voltage.

Let is be supposed that no backlash exists in the gears connecting the coarse commutator to the shaft. As the ball $j_1$ crosses the line $t_0$ the ball $a_2$ passes onto a land on the fine commutator so that the ball $q$, to which it is connected, is energised with a voltage. At the same instant, since the ball $q$ is bearing on the land $Q_1$ which is connected to the starter-finisher lands $SF_1$, $SF_2$ and $SF_3$ on the J track, these lands will be energised with a voltage. Then, before $Q_1$ ceases to be energised one-twentieth of a revolution of the coarse commutator later, $j_1$ bears on a main land $M_2J$. After further rotation when the ball $J_1$ is approaching the end of $M_2J$, the starter-finisher lands are again energised, this time from the land $R_1$, and remain energised until $j_1$ crosses the line $t_1$. During the one-tenth of a revolution of the coarse commutator just considered the balls $j_2$ and $j_3$ bear on starter-finisher lands $SF_2$ and $SF_3$ respectively, so that the J-output consists of a representative of the digit 1 for precisely one-tenth of a revolution of the coarse commutator, that is, one revolution of the shaft. In a similar way, for the remainder of one complete revolution of the coarse commutator, representations of the digits 0 and 1 alternately are obtained at the J-output, each binary digit lasting for precisely one revolution of the shaft.

Up to this point it has been assumed that no backlash is present in the gears. In practice backlash is encountered, so that the position of the lines $s_0$, $u_0$, $t_0$, $u_1, \ldots$ et cetera on the coarse commutator relative to the balls bearing on it, is not always a true indication of the rotational position of the shaft. Let it be assumed that backlash is present and is less than one-fortieth of a revolution of the coarse commutator, that is one division on any particular track of that commutator. This is a justifiable assumption, for in practice it should be possible to make backlash less than one-sixtieth of a revolution. Now if the position of the coarse commutator shown in FIGURE 3 is such that the commutator is lagging behind the position it would have if no backlash were present, then the land $Q_1$, will not become energised until the ball $q$ has reached some point between the lines $t_0$ and $u_1$. When the land $Q_1$ is energised, the lands $SF_1$, $SF_2$ and $SF_3$, to which it is connected, will be energised. Then, since the ball $j_1$ does not pass on to the main land $M_2J$ until it reaches the line $u_1$, the J-output will change from 0 to 1 at the same rotational position of the shaft as in the absence of backlash. A similar argument applies if the backlash causes the coarse commutator to be in advance of the position it would have in the absence of backlash.

In the same way it can be seen that backlash of less than one division has no effect on the J-output at all positions of the coarse commutator in one revolution. Thus the arrangement of lands described above, and the method of energising the starter-finisher lands from the fine commutator, will result in a J-output which is independent of a reasonable amount of backlash, and is determined entirely by the rotational position of the shaft; for the effect of backlash is to delay or advance the coarse commutator in its motion relative to the balls bearing on it, to an extent which, if less than one-fortieth of a revolution of the commutator, cannot alter the J-output relative to the rotational position of the shaft.

So far the description has concerned the representation of the least significant digit in a cyclic permuting decimal code by means of binary digits $W_0$, $X_0$, $Y_0$, and $Z_0$. The description which follows concerns the representation of the next significant digit in the cyclic permuting decimal code by means of the binary digits $W_1$, $X_1$, $Y_1$, and $Z_1$.

The $X_1$ digit is represented on the track K, the output corresponding to this digit being obtained from the two balls $k_1$ and $k_2$ which are connected electrically. The track K contains one starter land SK, one finisher land FK, and one main land MK. Lands SK and FK are both three divisions in length. SK extends from the line $u_{17}$ to the line $t_9$: FK extends from the line $t_0$ to the line $u_2$. The main land MK is six divisions in length and extends from the line $u_0$ to the line $u_{11}$. In the production of the output corresponding to the $X_1$ digit, lands $P_5$, $O_2$, $P_2$ and $O_4$ are effective for energising the starter and finisher lands at appropriate times. In ten revolutions of the shaft the K-output is 1000110001, where each binary digit occupies exactly one revolution of the shaft; and by an argument similar to that used in the case of the $W_0$ digit, it follows that the K-output is independent of any backlash which does not exceed one-fortieth of a revolution of the coarse commutator.

The $Y_1$ and $Z_1$ digits are represented on the tracks G and N, the output corresponding to the $Y_1$ digit being obtained from the two balls $n_1$ and $g_1$, which are connected electrically, and the output corresponding to the $Z_1$ digit is obtained from the two balls $n_2$ and $g_2$, which are also connected electrically. The track contains a starter land SN and a finisher land FN. The track G contains a main land MG. The lands SN and FN are both three divisions in length. SN extends from the line $u_3$ to the line $t_2$: FN extends from the line $t_7$ to the line $u_{16}$. MG is 22 divisions in length, and extends from the line $u_4$ to the line $u_{15}$. By means of the lands $P_1$, $O_5$, $P_4$ and $O_3$ the starter and finisher lands SN and FN are energised and de-energised at appropriate positions of the shaft, so that the output obtained for the $Y_1$ digit is 0011111100, and for the $Z_1$ digit is 1110000111, in ten complete revolutions of the shaft; each binary digit occupies precisely one revolution of the shaft, and the output in each case is independent (in the same way as the $W_0$ output) of any backlash which does not exceed one-fortieth of a revolution of the commutator The $W_1$ digit is represented on the tracks L and H. The starter and finisher lands SL and FL are each three divisions in length and extend from the lines $u_{19}$ and $t_4$ to the lines $t_0$ and $u_{10}$, respectively. The main land MH is eighteen divisions in length and extends from the line $u_0$ to the line $u_9$. By means of the lands $P_3$ and $O_1$ the lands SL and FL are respectively energised or de-energised at suitable positions of the shaft, so that the output from the two balls $l$ and $h$, which are connected electrically, is 0000011111, where each binary digit occupies precisely one revolution of the shaft. As described previously for the digit $W_0$, this output may be shown to be independent of any backlash which does not exceed one-fortieth of a revolution of the coarse commutator.

To this point the representations of the binary digits $W_1$, $X_1$, $Y_1$, $Z_1$; $W_0$, $X_0$, $Y_0$, and $Z_0$, by means of elements on the coarse and fine commutators of a digital encoder, have been described separately. It will be clear to one versed in the art that the outputs corresponding to the aforesaid binary digits will provide a representation of numbers in a cyclic permuting decimal code a sequence of such numbers being obtained for ten successive complete revolutions of the shaft.

In FIGURE 4 the outputs corresponding to the binary digits are represented diagrammatically for three and one-fifth revolutions of the shaft from an initial position in which the fine commutator is one-half of a revolution removed in a clock-wise sense from the position which it occupies with respect to the balls in FIGURE 2, and the coarse commutator is in the position for which the balls $e$, $g_1$, $j_1$, . . . lie on the line $s_0$ and the balls $g_2$, $h$, $k_2$, . . . lie on the line $s_5$. The cross-hatched regions in FIGURE 4 correspond to the value 1 of the binary digits, and absence of cross-hatching corresponds to the value 0 of the binary digits. The pattern followed by the least significant digit in the cyclic permuting decimal code is particularly to be noticed in relation to that followed by the $W_0$ digit, which changes only once per revolution of the shaft and hence must be represented on the coarse commutator. Along the line $xy$ in FIGURE 4 the output from the two commutators is displayed corresponding to a position of the shaft after between one and two fifths, and one and one-half revolutions, of the shaft. The corresponding normal decimal number is 14, which in the cyclic permuting decimal code is 15. In the binary representation this number is 00011110, and the diagram indicates from which balls the outputs corresponding to the eight binary digits are obtained.

In the previous description hereinbefore certain electrical connections between lands on the coarse commutator have been specified. One method of making these connections is by means of annular tracks interspaced between some of the tracks E, G, H, J, K, L, N, O, P, Q and R together with radial tracks lying on the face of the coarse commutator. In FIGURE 3 one set of suitable connections is shown. It is to be seen that the main lands on the tracks G, H and J are connected to the feed track E by means of radial connections. All the lands on the tracks J, Q and R except $M_1J$ and $M_2J$ are connected together into one electrical circuit by means of annular and radial connections as shown in FIGURE 3. Also all the lands on the tracks K, L, N, O and P, except MK, are connected together to form another electrical circuit by connections such as those shown in the FIGURE 3. There is a connection between the main lands MK and $M_1J$ which can be made as shown in FIGURE 3 by means of annular and radial tracks. One of the radial tracks crosses the tracks Q and R along the line $s_4$, so that the brushes $q$ and $r$ will be energised on crossing the line $s_4$. But since the brushes $q$ and $r$ are only connected to the brushes $a_2$ and $a_3$ respectively, associated with the fine commutator, no disturbance will be introduced into the outputs taken by the brushes bearing on the coarse commutator.

In order to facilitate description, the balls bearing against the commutators are mainly arranged along radial lines adjacent to the commutators in the embodiment hereinbefore described. Mechanical considerations, such as considerations of size, may necessitate that the balls should be in a staggered relationship. Clearly this may be accomplished by similarly staggering their associated commutator tracks.

The digital encoder hereinbefore described includes a coarse commutator from which outputs are obtained from one, two or three brushes bearing on each track of the commutator. For example, by the use of two brushes $k_1$ and $k_2$ bearing on the K track it is possible to include the main land MK on the same track as the starter and finisher lands SK and FK. Thus the $X_1$ digit is represented on one track alone, whilst two tracks are necessary for the representation of the $Y_1$ digit. The reason for this difference is that in one complete rotation of the coarse commutator the output corresponding to the $X_1$ digit must be 1000110001, which consists of the pattern 10001 repeated once. However, the $Y_1$ pattern cannot be subdivided in the same way. In general, if an output for one rotation of the coarse commutator consists of an elementary pattern occurring $n$ times, $n$ brushes at the vertices of a regular $n$-polygon may be used to take the output from a suitably coded track. Clearly it would be necessary only to code one elementary arc (the arc between two adjacent vertices of the $n$-polygon) with starter and finisher lands, and another elementary arc with suitable main lands. If it is desired to use less than $n$ balls, then further elementary arcs of the track must be coded. For example, the J-output from the coarse commutator consists of the elementary pattern 10 recurring five times in one rotation of the coarse commutator. By inspection it is not difficult to observe that three brushes $j_1$, $j_2$ and $j_3$ as shown in FIGURE 3, that is a reduction of two from a pentagonal array, is the least possible number for the representation of the $W_0$ digit on one track of the coarse commutator.

To increase the reliability in practice of the kind of encoder described hereinbefore, main lands can be introduced between each pair of starter and finisher lands on the coarse commutator. In this way two balls bear on main lands for a considerable portion of the total duration of a given output. Although the chance of one ball failing to make contact with a land when it should is remote, the chance of two balls in parallel failing simultaneously is negligible.

Although the above-described digital encoder employs a cyclic permuting binary-decimal code, it will be apparent to those versed in the art that such an encoder may be easily adapted so as to utilise other codes employing binary digits. Further, although the commutators hereinbefore described each have only ten divisions in one complete turn, it will be understood that they are described by way of example only and in the interests of simplicity. Clearly, commutators having, for example one-hundred, two-hundred or even one-thousand divisions may be constructed by employing similar principles. To make the essential principles more clear, the spacing of the balls and the location and staggering of the lands of the coarse commutator have been described in terms of divisions rather than in terms of angles.

A feature of the digital encoder hereinbefore described is the use of starter lands, finisher lands and starter-finisher lands in conjunction with coded feed tracks O, P, Q and R on the coarse commutator. Let it be supposed that the starter-finisher lands $SF_1$, $SF_2$, and $SF_3$ of the J track are each replaced by two lands separated by a small gap so as to form starter and finisher lands $S_1$, $F_1$; $S_2$, $F_2$; and $S_3$, $F_3$, respectively. Further, let all the starter lands on the coarse commutator except $S_1$, $S_2$ and $S_3$, be joined to form one electrical circuit in which the lands $F_1$, $F_2$ and $F_3$ are included; and similarly let all the finisher lands except $F_1$, $F_2$ and $F_3$ be joined to form together with the lands $S_1$, $S_2$ and $S_3$, another electrical circuit. Now if these two circuits are connected respectively to two continuous feed tracks fed respectively from the ball-bearings $a_1$ and $a_2$ associated with the fine commutator, the outputs from the coarse commutator will provide, with the outputs from the fine commutator, a digital representation of the rotational position of the shaft over a number of revolutions of the shaft, independently of a reasonable amount of backlash in the gears. This method of energising the lands of the coarse commutator requires only two feed tracks on that commutator, but suffers from the disadvantage that the interconnections between lands of the course commutator are not easily made on the face of the commutator.

Two commutators only are used in the encoder hereinbefore described, but if necessary the range of digital representation of the rotational positions of a shaft can be extended by using the coarse commutator to drive a planetary reduction gear and a third commutator, the lands on this third commutator being energised by outputs from the coarse commutator.

In an alternative embodiment, the fine commutator need not take the form of a circular disc, but may be in the form of a linear scale of similar composition and read by means of balls as before. The movement of the scale may then drive a shaft by means of a rack-and-pinion drive, the shaft driving the coarse commutator directly.

FIGURE 5 is a schematic diagram of such an embodiment. FIGURE 5 shows a linear commutator 51 comprising a copper scale having tracks A, B, C and D thereon in a manner similar to that described with reference to FIGURE 2. As in that case, the shaded areas indicate lands or conductive regions, all the lands on the tracks are connected together electrically and the depressions between the lands are filled with a hard non-conductive resin. The commutator is divided into notional divisions. The pattern of lands on the commutator 51 is repetitive every ten of these notional divisions. Eight balls $a_1$, $a_2$, $a_3$, $a_4$; $b$; $c_1$, $c_2$; and $d$ bear on the tracks A, B, C and D respectively. These balls are maintained in contact with the commutator by means of a ball carrier 52 which is held in a fixed position. The eight balls interact with the commutator in a similar manner to the balls having the same reference in FIGURE 2, the same sequence of outputs being obtained for each repetition of the commutator pattern moving past the balls as for one complete rotation of the commutator shown in FIGURE 2.

The commutator 51 carries a rack 53 which engages with a pinion 54 so that the pinion is rotated as the commutator moves past the balls. The pinion 54 is carried on a shaft 55 which is arranged directly to drive a coarse commutator 56 instead of through a reduction gear as shown in FIGURE 3. The gear ratio of the rack-and-pinion drive is so arranged that the shaft 55 is rotated through one-tenth of a revolution for each traversal of one complete pattern on the commutator 51 past the balls. The balls $a_1$ to $a_4$ are connected to the same balls $p$, $q$, $r$ and $o$ respectively bearing on the coarse commutator as the balls having the same reference letter and numerals in FIGURE 2. As in FIGURE 2, the balls are shown in contact with the commutator so as to give an output representing the pair of digits 4/5. With the balls in this position relative to the fine commutator, the coarse commutator will be in the same position relative to its balls as it is shown in FIGURE 3.

I claim:

1. An electrical digital encoder including a fine commutator, a coarse commutator, a gear means for driving the coarse commutator from the fine commutator, at least one main track on the coarse commutator marked with at least one non-conductive region and at least one main conductive region in accordance with a code element of a predetermined code, means for connecting each main conductive region permanently to an electrical voltage source, a subsidiary track associated with each main track to represent the said code element and marked with non-conductive regions and subsidiary conductive regions, means for coding voltage inputs to the subsidiary conductive regions in accordance with the position of the fine commutator, brush means bearing on each main track for taking an output therefrom and brush means bearing on each associated subsidiary track for taking an output from a subsidiary conductive region on the subsidiary track at least during a change in output from its associated main track, the length of each main conductive region being shorter than is required for the coded outputs from the coarse commutator and the arrangement and mode of energisation of the subsidiary conductive regions being such that the outputs therefrom are at least part of a coarse representation of the position of the fine commutator relative to a datum position.

2. An electrical digital encoder as claimed in claim 1 and wherein the coarse commutator has a first track and a second track thereon to represent a single code element, at least one relatively stationery brush co-operating with each track, a main conductive region on the first track, means for continuously connecting a voltage source to the main conductive region, the positional interrelationship between a first brush and the main conductive region being such that as the coarse commutator is rotated in a predetermined sense of rotation relative to the brushes the first brush is connected to the voltage source after a voltage output is required and is disconnected from the voltage source before the voltage output is required to cease in representing the code element, a starter subsidiary conductive region on the second track and arranged to co-operate with a second brush so that as the coarse commutator is rotated relative to the brushes in the predetermined sense of rotation the second brush bears on the starter subsidiary conductive region before a voltage output is required in representing the code element and remains bearing on the starter subsidiary conductive region until the first brush bears on the main conductive region, a finisher subsidiary conductive region on the second track and arranged to co-operate with the second brush so that as the coarse commutator is rotated relative to the brushes in the predetermined sense of rotation the second brush bears on the finisher subsidiary conductive region before the first brush leaves the main conductive region and remains bearing on the finisher subsidiary conductive region until after a voltage output is required in representing the code element, means for applying a voltage from the fine commutator to the starter subsidiary conductive region as the coarse commutator is rotated in the said predetermined sense from the position of the fine commutator at which the said voltage output is required until after the first brush bears on the main conductive region, means for applying a voltage from the fine commutator to the finisher subsidiary conductive region as the coarse commutator is rotated in the said predetermined sense before the first brush ceases to bear on the main conductive region until the said voltage output is no longer required and coarse commutator output means connected to both the first brush and the second brush.

3. An electrical digital encoder as claimed in claim 2 and wherein the fine commutator includes a linear scale and is arranged to rotate the coarse commutator through a rack-and-pinion drive.

4. An electrical digital encoder as claimed in claim 2 and wherein the fine commutator has reading means co-operating therewith to provide as it moves relative to the datum position, a repetitive sequence of voltage outputs and a voltage for application to the starter conductive region alternately with a voltage for application to the finisher conductive region, each voltage lasting for one-half of the movement of the fine commutator required for a complete repetition of voltage outputs to be made.

5. An electrical digital encoder as claimed in claim 4 and wherein the fine commutator includes a disc and on one face of the disc an annular track having a semi-circular conductive region and a semi-circular non-conductive region and wherein two diametrically opposed brushes bear on the track, means being provided for applying a voltage to the conductive region.

6. An electrical digital encoder as claimed in claim 5 and wherein the means for applying a voltage from the fine commutator to the starter subsidiary conductive region includes a first coded feed track on the coarse commutator, a first feed conductive region on the coded feed track, a first feed brush bearing on the coded feed track, means for connecting the feed conductive region to the starter subsidiary conductive region and means for connecting the feed brush to a voltage from the fine commutator, the length of the feed conductive region and the disposition of the feed brush being such that the feed brush bears on the feed conductive region when, and only when, the said second brush bears on the starter subsidiary conductive region.

7. An electrical digital encoder as claimed in claim 6 and wherein the said means for applying a voltage from the fine commutator to the finisher subsidiary conductive region includes a second coded feed track on the coarse commutator, a second feed brush bearing on the second feed track, a second feed conductive region on the second coded feed track, means for connecting the second feed conductive region to the finisher subsidiary conductive region, means for connecting the second feed brush to a voltage from the fine commutator, the length of the second conductive region and the disposition of the second feed brush being such that the second feed brush bears on the second feed conductive region when, and only when, the second feed brush bears on the finisher subsidiary conductive region.

8. An electrical digital encoder as claimed in claim 7 and wherein there are provided electrical connections between the first feed conductive region, the second feed conductive region, the starter subsidiary conductive region and the finisher subsidiary conductive region.

9. An electrical digital encoder as claimed in claim 8 and wherein the brushes comprise balls and springs urging the balls into engagement with their associated tracks.

10. An electrical digital encoder including a fine commutator, pick-off brushes, a coarse commutator having a track thereon representing a single code element which requires a sequential pattern of outputs from the encoder to occur $n$ times in each complete revolution of relative rotation between the coarse commutator and the pick-off brushes, means for driving the pick-off brushes and the coarse commutator in a rotary motion relative to one another from the fine commutator, a set of said pick-off brushes co-operating with the track, a main conductive region in at least one arc of $2\pi/n$ radians of said track, the length of each main conductive region and the disposition of said set of pick-off brushes being such that, for a predetermined sense of relative rotation between the coarse commutator and the pick-off brushes, at least one brush bears on a main conductive region once every $2\pi/n$ radians of relative rotation and that a brush bears on a main conductive region after an output is required and leaves a main conductive region before an output is required to cease, means for continuously connecting each main conductive region to a voltage source, a subsidiary conductive region in at least one of the remaining arcs of $2\pi/n$ radians of said track, the length of each subsidiary conductive region and the disposition of said set of pick-off brushes being such that at least one of the brushes bears on a subsidiary conductive region before an output is required and leaves a subsidiary conductive region after an output is required to cease, means for applying voltages from the fine commutator to each subsidiary conductive region from a position of the fine commutator at which an output is required at least until a brush bears wholly on a main conductive region and from a position of the fine commutator at which a brush still bears wholly on a main conductive region until a position of the fine commutator at which an output is required to cease, as the coarse commutator and the brushes rotate relative to one another in said predetermined sense, and means for connecting together the outputs of said set of pick-off brushes.

11. An electrical digital encoder as claimed in claim 10 and wherein there are $n$ brushes equally spaced around the track.

12. An electrical digital encoder as claimed in claim 10 and wherein the fine commutator includes a linear scale and is arranged to rotate the coarse commutator through a rack-and-pinion-drive.

13. An electrical digital encoder as claimed in claim 10 and wherein the fine commutator is arranged to provide a first voltage for application to the coarse commutator and a second voltage for application to the coarse commutator, the first voltage being provided alternately with the second voltage as the commutator moves relative to the datum position, and wherein the said means for applying voltages from each commutator to the subsidiary conductive region includes a first coded feed track on the coarse commutator, a first feed conductive region on the first coded feed track, a first feed brush bearing on the first feed track, a second coded feed track on the coarse commutator, a second feed conductive region on the second feed track, a second feed brush bearing on the second coded feed track, means for electrically connecting the first and second conductive regions to the subsidiary conductive regions, means for applying the said first voltage to the first feed brush, means for applying the said second voltage to the second feed brush, the length of the first feed conductive region and the second feed conductive region each being one-half the length of a subsidiary conductive region and the disposition of the first and second feed brushes being such that one or the other of them bears on a feed conductive region when, and only when, a brush is bearing on a subsidiary conductive region.

14. A digital encoder as claimed in claim 13 and wherein the fine commutator has reading means cooperating therewith to provide, as it moves relative to the said datum position, a repetitive sequence of voltage outputs and two voltages for application to the subsidiary conductive regions, each voltage lasting alternately with the other for one-half of the movement of the fine commutator required for one complete repetition of voltage outputs to be made.

15. An electrical digital encoder as claimed in claim 14 and wherein the fine commutator includes a disc, on one face of the disc an annular track having a semi-circular conductive region and semi-circular non-conductive region and wherein two diametrically opposed brushes bear on the track, means being provided for applying a voltage to the conductive region.

16. An electrical digital encoder as claimed in claim 15 and wherein the brushes comprise balls and springs urging the balls into engagement with their associated tracks.

17. An electrical digital encoder as claimed in claim 15 and wherein the tracks are coded in accordance with a cyclic permuting binary-decimal code in which the digits of a reflecting decimal code are represented in a cyclic permuting binary code, the binary code representing a decimal digit being the same, except for one binary digit, as the binary code representing that decimal digit's nines complement.

18. An electrical digital encoder including a fine commutator, a coarse commutator, a plurality of tracks on said coarse commutator, said tracks being marked with main conductive regions, associated subsidiary conductive regions and non-conductive regions representing the elements of a predetermined code, the main conductive regions being shorter than required by the code, means for connecting the main conductive regions permanently to a voltage source, means for energizing the subsidiary conductive regions by voltage outputs from the fine commutator, brush means rotatable relative to the coarse commutator for taking outputs from the main conductive regions and for taking an output from a subsidiary conductive region representing the same code element as a main conductive region from a rotational position at which a brush is wholly in contact with the said main conductive region to beyond a rotational position at which no output is required in representing the said code element when the brush means and the coarse commutator are rotated in either sense relative to one another, means connecting together outputs derived from conductive regions representing the same code elements, and gear means for driving said brush means and said coarse commutator relative to one another from said fine commutator.

19. An electrical digital encoder including a fine commutator, a coarse commutator, at least one main conductive region on the coarse commutator at least one subsidiary conductive region on the coarse commutator, non-conductive regions insulating the conductive regions from one another, brush means bearing on the coarse commutator and having a first brush and a second brush connected together to a common output arranged so that said first brush wholly contacts a main conductive region when said second brush initially contacts a subsidiary conductive region and the second brush bears on a subsidiary conductive region when a change in output from the brush means is required, means for connecting each main conductive region directly to a source of voltage, and means for changing the input to each subsidiary conductive region at predetermined positions of the fine commutator relative to a datum position.

20. An electrical digital encoder including a fine commutator, a coarse commutator disc having a first track and a second track on one face thereof to represent a single code element, at least one brush cooperating with each track, means for driving the coarse commutator disc and brushes relative to one another from the fine commutator, a main conductive region on the first track, means for continuously connecting a voltage source to the main conductive region, a first brush bearing on the first track, the positional interrelationship between the first brush and the main conductive region being such that as the coarse commutator disc and the brushes are rotated relatively to one another in a predetermined sense the first brush is connected to the voltage source after a voltage output is required and is disconnected from the voltage source before a voltage output is required to cease in representing the code element, a second brush bearing on the second track and connected to the first brush, a starter subsidiary conductive region on the second track and arranged to co-operate with said second brush so that as relative rotation in the predetermined sense takes place between the coarse commutator disc and the brushes, the second brush bears on the starter subsidiary conductive region before a voltage output is required in representing the code element and remains bearing on the starter subsidiary conductive region until the first brush bears wholly on the main conductive region, a finisher subsidiary conductive region on the second track and arranged to co-operate with the second brush so that as relative rotation in the predetermined sense takes place between the coarse commutator disc and the brushes, the second brush bears on the finisher subsidiary conductive region before any part of the contact surface of the first brush leaves the main conductive region and remains bearing on the finisher subsidiary conductive region until after a voltage output is required to cease in representing the code element, means for applying a voltage from the fine commutator to the starter subsidiary conductive region from the position of the fine commutator at which said voltage output is required until after the first brush bears on the main conductive region, and means for applying a voltage from the fine commutator to the finisher subsidiary conductive region before the first brush ceases to bear on the main conductive region until a position of the fine commutator at which said voltage output is no longer required.

References Cited in the file of this patent

UNITED STATES PATENTS

| | | |
|---|---|---|
| 2,685,054 | Brenner | July 27, 1954 |
| 2,779,539 | Darlington | Jan. 29, 1957 |
| 2,793,807 | Yaeger | May 28, 1957 |
| 2,813,677 | Scarbrough | Nov. 19, 1957 |
| 2,818,557 | Sink | Dec. 31, 1957 |
| 2,852,764 | Frothingham | Sept. 16, 1958 |
| 2,866,184 | Gray | Dec. 28, 1958 |
| 2,873,440 | Speller | Feb. 10, 1959 |
| 2,880,410 | Postman | Mar. 31, 1959 |